United States Patent [19]

Hlavaty

[11] Patent Number: 5,146,712
[45] Date of Patent: Sep. 15, 1992

[54] POWER SLIDING WINDOW FOR TRUCK CAB

[75] Inventor: David G. Hlavaty, Allen Park, Mich.

[73] Assignee: General Motors Corporation, Detroit, Mich.

[21] Appl. No.: 666,286

[22] Filed: Mar. 8, 1991

[51] Int. Cl.[5] ............................................. E05F 17/00
[52] U.S. Cl. ....................................... 49/118; 49/123; 49/360
[58] Field of Search ................. 49/116, 118, 360, 380, 49/123

[56] References Cited

U.S. PATENT DOCUMENTS

| | | | |
|---|---|---|---|
| 1,634,954 | 7/1927 | McInerney | 49/118 X |
| 1,917,415 | 7/1933 | Woodruff | 49/118 X |
| 3,199,858 | 8/1965 | Koblensky | 268/97 |
| 3,321,234 | 5/1967 | Harrell et al. | 49/370 X |
| 3,403,474 | 10/1968 | Spasoff | 49/360 |
| 4,119,341 | 10/1978 | Cook | 296/146 |
| 4,177,605 | 12/1979 | Cherbourg et al. | 49/98 |
| 4,322,914 | 4/1982 | McGaughey | 49/370 |
| 4,614,059 | 9/1986 | Trampe | 49/118 |
| 4,635,398 | 1/1987 | Nakamura | 49/370 X |
| 4,671,013 | 6/1987 | Friese et al. | 49/380 |
| 4,674,231 | 6/1987 | Radek et al. | 49/118 |
| 4,793,099 | 12/1988 | Friese et al. | 49/380 |
| 4,920,698 | 5/1990 | Friese et al. | 49/380 |
| 4,991,347 | 2/1991 | Takemoto et al. | 49/118 X |
| 4,995,195 | 2/1991 | Olberding et al. | 49/118 |

FOREIGN PATENT DOCUMENTS 189598  5/1964  Sweden ................... 49/116

Primary Examiner—Renee S. Luebke
Assistant Examiner—Jerry Redman
Attorney, Agent, or Firm—Raymond I. Bruttomesso, Jr.

[57] ABSTRACT

A power window assembly for a rear window opening of a truck cab has a pair of stationary window panes spaced apart and securely mounted in the rear window opening and defining therebetween a center window opening. First and second movable window panes are slidably located in the rear window opening and adapted for sliding movement toward each other to a closed position where the panes abut each other closing the center window opening and away from each other to an opened position overlying at least a portion of the stationary window panes thereby opening the center window opening. A reversible electric motor has a primary drive gear for generating rotary motion of the primary drive gear. A tape having a plurality of slots engaging and driven by the primary drive gear is connected to the first movable window so that the first movable window pane moves between the closed position and the opened position. A secondary drive gear is rotatably mounted and engages the tape and the second movable window pane so that the tape drives the secondary drive gear and the secondary drive gear drives the second movable window pane whereby the movable window panes move simultaneously toward each other to the closed position and away from each other to the opened position.

1 Claim, 3 Drawing Sheets

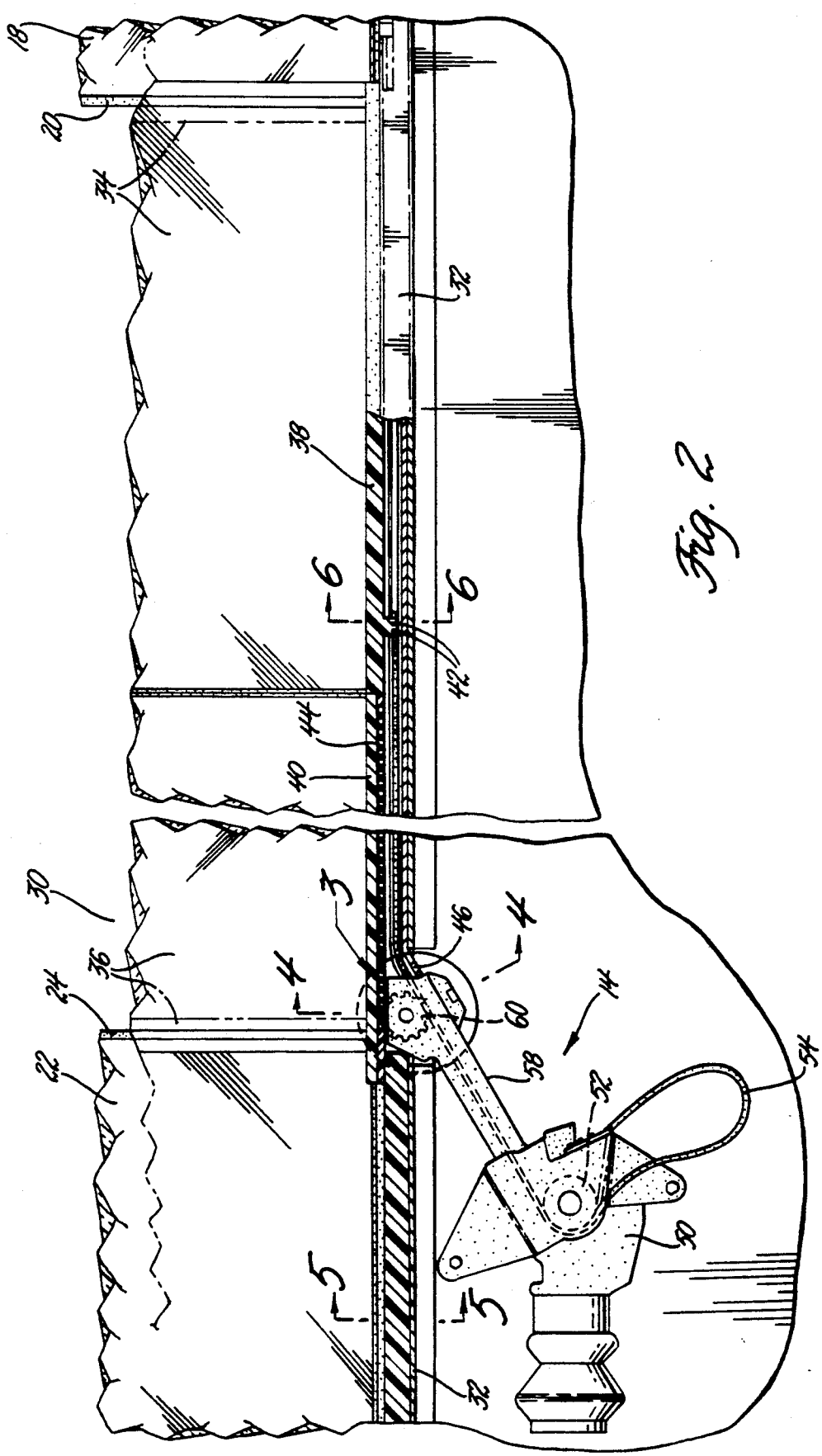

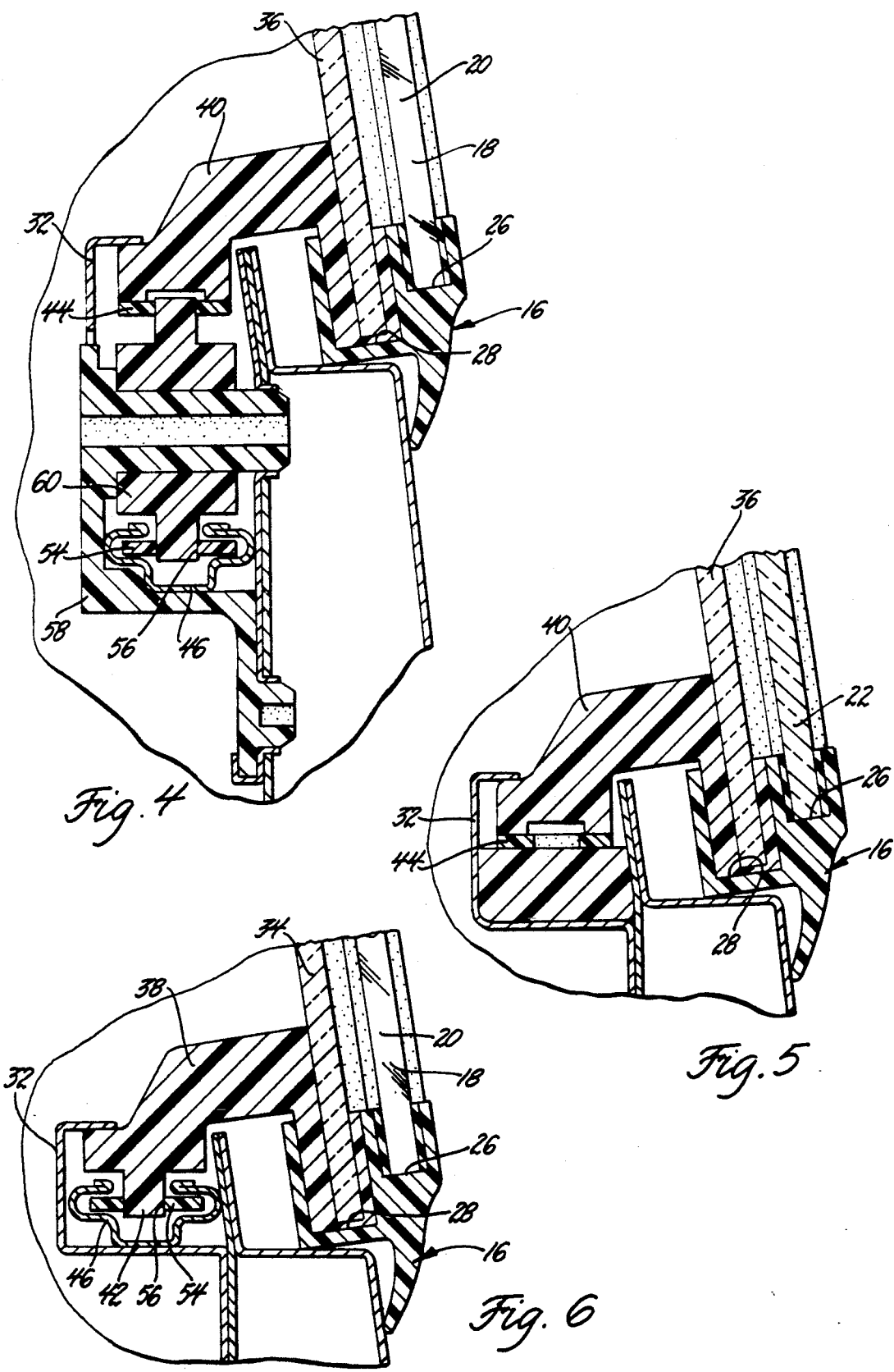

POWER SLIDING WINDOW FOR TRUCK CAB

This invention relates to a power window assembly for a pair of movable window panes in a rear window of a truck cab and more particularly to a power window assembly for moving the window panes in opposite directions.

BACKGROUND OF THE INVENTION

It is known to have a portion of the rear window of a truck cab slide horizontally to create an opening to increase ventilation through the cab and to create a passage to the bed of the truck.

It is known to have a fixed rear window with a central opening defined between a pair of stationary window panes and to provide a slidable window pane that slides horizontally to a position overlying one of the stationary window panes. It is also known to have a reversible electric motor driving a rack and pinion arrangement for sliding this slidable window pane between the opened and closed positions.

For example, U.S. Pat. No. 4,920,698 patent discloses a rack and pinion arrangement where the rack is attached to the slidable window pane and is engaged by the pinion. A reversible motor rotates the pinion through a rotating transmission cable. A switch operates the motor, allowing the operator to open the window without having to turn around. The patent also discloses an alternative in which a slotted tape has one end of the tape secured to the slidable window pane is engaged by a gear driven by motor so that the tape pushes the slidable window pane in one direction and pulls the window in the other direction between the opened and closed positions. The shortcoming of a single pane is the limited area that can be opened.

It would be desirable to have a pair of movable window panes that are driven horizontally in opposite directions to create a center opening by a single remotely located motor.

SUMMARY OF THE INVENTION

This invention provides a power window assembly for a rear window opening of a truck cab. The rear window opening has an inboard channel and an outboard channel. A raceway is formed along the rear window opening next to the inboard channel. The power window assembly has a pair of stationary window panes spaced apart and securely mounted in the outboard channel of the rear window opening and defining therebetween a center window opening. First and second movable window panes are slidably located in the inboard channel of the rear window opening and adapted for sliding movement toward each other to a closed position where the panes abut each other closing the center window opening and away from each other to an opened position overlying at least a portion of the stationary window panes thereby opening the center window opening. The movable window panes each have an arm which projects into the raceway. A reversible electric motor has a primary drive gear for generating rotary motion of the primary drive gear. A tape guided in a track and having a plurality of slots engages and is driven by the drive gear so that the the tape moves in a translational push-pull movement upon rotation of the drive gear by the motor. A plurality of teeth of the arm of the first movable window pane depend into the track and engage the slots in the tape so that the tape drives the first movable window pane and the first movable window pane moves between the closed position and the opened position. A secondary drive gear is rotatably mounted and engages the tape. A rack carried by the arm of the second movable window pane and received in the raceway engages the secondary drive gear so that the secondary drive gear drives the secondary movable window pane whereby the movable window panes move simultaneously toward each other to the closed position and away from each other to the opened position.

One object, feature and advantage resides in a power window assembly for a rear window opening having a secondary drive gear driven by a slotted tape and driving a second movable window pane so that the movable window panes move simultaneously toward each other to a closed position and away from each other to an opened position.

Another object, feature and advantage resides in the provision of a power window assembly having a pair of movable window panes and the movable window panes move simultaneously toward each other to a closed position and away from each other to an opened position.

Further objects, features and advantages of the present invention will become more apparent to those skilled in the art as the nature of the invention is better understood from the accompanying drawings and detailed description

BRIEF DESCRIPTION OF THE DRAWINGS

FIG. 2 is an elevation view of the power window assembly with the windows in the closed position. The windows are shown in phantom in the opened position.

FIG. 4 is a sectional view taken in the direction of arrows 4—4 of FIG. 2.

FIG. 5 is a sectional view taken in the direction of arrows 5—5 of FIG. 2 with the window in the opened position.

FIG. 6 is a sectional view taken in the direction of arrows 6—6 of FIG. 2.

DESCRIPTION OF THE PREFERRED EMBODIMENT

Figure 1:
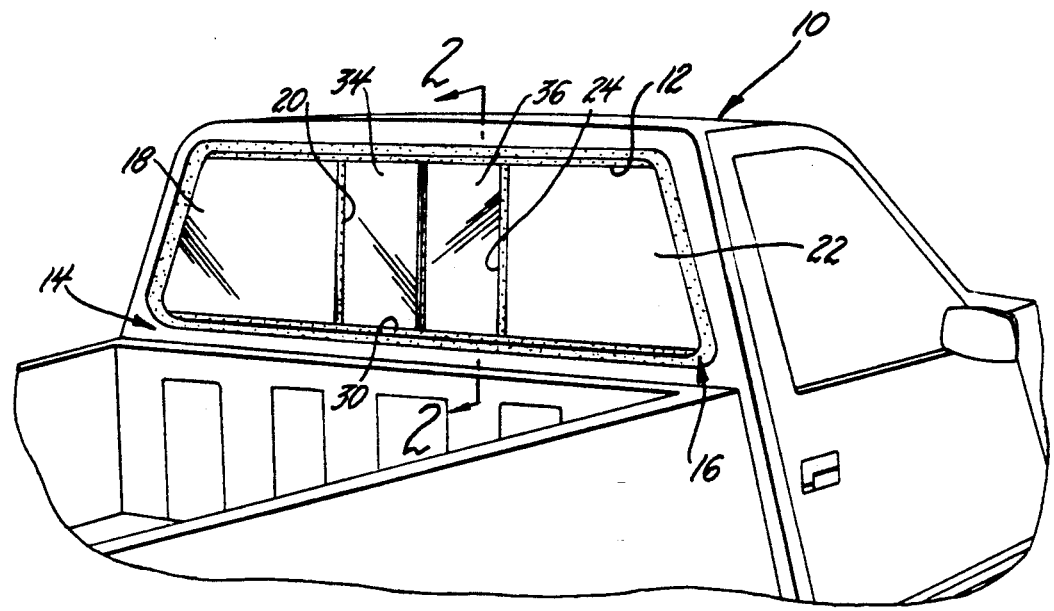
FIG. 1 is a fragmentary isometric view of the rear portion of a truck cab.

Referring to FIG. 1, a truck cab 10 has a rear trapezoidal shaped window opening which is bordered on the lower edge of the inboard sided by a raceway 32 formed of sheet metal. A power window assembly 14 is installed in window opening 12 and has a frame 16 with substantially the same shape as the window opening 12. The frame 16 has an inboard channel 28 and an outboard channel 26 as seen in FIG. 4. Referring to FIG. 2, a first stationary window pane 18 is permanently mounted in the outboard channel 26 in the frame 16 and has a free edge 20 which does not engage the frame 16. A second stationary window panel 22 is also permanently mounted in the outboard channel 26 in the frame 16 and likewise has a free edge 24. Referring to FIG. 2, the free edges 20 and 24 of the stationary window panes 18 and 22 and the inboard channel 28 define a center window opening 30.

A first movable window pane 34, with an arm 38 that extends across the entire lower edge, is slidably mounted in the inboard channel 28 as seen in FIGS. 2 and 6. The first movable window 34 slides between a closed position covering a portion of the center window opening 30 as shown in FIG. 2 and an opened position overlying at least a portion of the first stationary window 18 as shown in phantom in FIG. 2. Referring to FIG. 6, the arm 38 has a portion that depends into the raceway 32.

Likewise referring to FIG. 4, a second movable window pane 36, with an arm 40 extending across the entire lower edge, is slidably mounted in the inboard channel 28 and slidably moves between the closed position covering a portion of the center window opening 30 as shown in FIG. 2 and the opened position overlying at least a portion of the second stationary window 22 as shown in phantom in FIG. 2. Referring to FIG. 4, the arm 40 has a portion that depends into the raceway 32.

A reversible electric motor 50 is located under the rear window opening 12 and in close proximity to where the second stationary window panel 22 mounts to the frame 16 as seen in FIG. 2. A primary drive gear 52 is mounted to and rotates with the reversible electric motor 50. A molded housing 58 encases the primary drive gear 52.

A tape 54 made of Dymetrol, a polyester elastomer made by Dupont, or similar material is guided by a track 46. The track 46 is made of rolled steel or other suitable material and located in the housing 58 and a portion of the raceway 32 and extends between the reversible electric motor 50 and the arm 38 of the first movable window pane 34. The tape 54 has a plurality of slots 56 adapted for engaging and driven by the primary drive gear to move the tape 54 in a translational push-pull movement.

Referring to FIGS. 2 and 6, a series of teeth 42 depend downward from the arm 38 of the first movable window pane 34 and engage and mesh with the slots 56 of the tape 54 which is guided in the track 46. The first movable pane 34 moves translationally with the tape 54 between the closed position of Figure and the opened position shown in phantom in FIG. 2.

Figure 3:
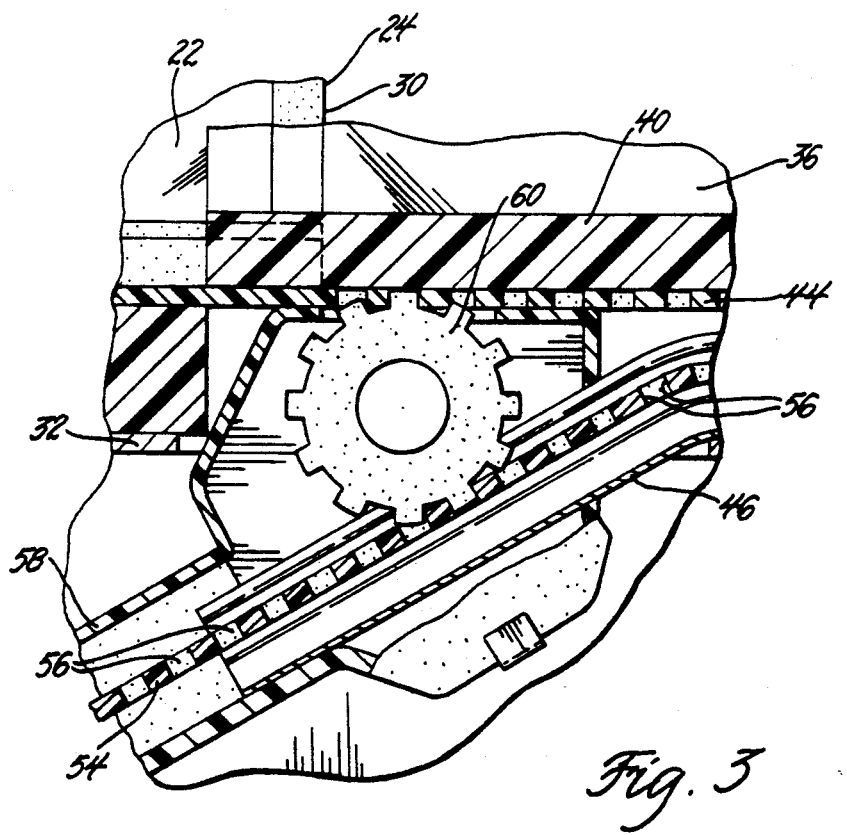
FIG. 3 is an enlargement of the encircled portion of FIG. 2.

Referring to FIGS. 3 and 4, a secondary drive gear 60 is rotatable mounted to the molded housing 58 directly under the second movable window pane 36. The secondary drive gear 60 engages the slots 56 in the tape 54 and a rack 44 carried on the bottom of the arm 40 of the second movable window pane 36. The rack 44 as shown in FIG. 5 is a slotted tape similar to tape 54 that is secured to the arm 40. Referring to FIG. 2, as the tape 54 moves in the push-pull movement moving the first movable window pane 34 between the opened and closed position, the engaged secondary drive gear 60 is rotated resulting in the second movable window pane 36 carrying the rack 44 being push-pulled between the opened and closed position, thereby the movable window panes 34 and 36 move simultaneously toward each other to the closed position and away from each other to the opened position.

To open the movable window panes 34 and 36, the operator pushes a switch in a cab, not shown, which is connected to the reversible electric motor 50. Referring to FIG. 2, the electric motor 50 drives the primary drive gear 52 in a clockwise direction. The primary drive gear 52, which is engaging the tape 54, pushes the tape 54 towards the first movable window pane 34. The teeth 42 mounted on arm 38 and engaging the tape 54 cause the first movable window pane 34 to slide to the right moving the first movable window pane 34 from the closed position shown in phantom in FIG. 2 to the opened position shown in FIG. 2. At the same time the secondary drive gear 60 is rotated counterclockwise by the movement of the tape 54 in the generally rightward direction. The secondary drive gear 60 which is engaged with the rack 44 of the second movable window pane 36 pushes the second movable window pane 36 in a leftward direction. The electric motor 50 stalls when the movable window panes 34 and 36 encounter the end of the inboard channel 28.

To close the movable window panes 34 and 36, the operator pushes the switch in a cab. Referring to FIG. 2, the electric motor 50 drives the primary drive gear 52 in a counterclockwise direction. The primary drive gear 52, which is engaging the tape 54, pulls the tape 54 away from the first movable window pane 34. The teeth 42 engaging the tape 54 cause the first movable window pane 34 to slide to the left moving the first movable window pane 34 from the opened position shown in FIG. 2 to the closed position shown in phantom in FIG. 2. At the same time the secondary drive gear 60 is rotated clockwise by the movement of the tape 54 in the generally leftward direction. The secondary drive gear 60 which is engaged with the rack 44 of the second movable window pane 36 pushes the second movable window pane 36 in a rightward direction. The electric motor 50 stalls when the two movable window 34 and 36 engage each other.

While an embodiment of the present invention has been explained, various modifications within the spirit and scope of the following claims will be readily apparent to those skilled in the art.

For example, an alternative method of connecting the tape to the first movable window pane is the lower edge of the arm having a rack. A drive block with a plurality of teeth seats in the raceway with the teeth meshing and engaging with the tape and the rack to cause the movable window panel to move translationally with the tape.

The rack 44 was shown in FIG. 5 as a slotted tape secured to the the arm 40, however the rack 44 could also be molded integral with the arm 40. Another alternative is to have the tape 54 and secondary drive gear 60 located in the inboard channel 28.

In the embodiment explained and the alternative given the movable window panes are adapted for sliding movement toward each other to a closed position and away from each other to an opened position thereby opening a center window opening.

The embodiments of the invention in which an exclusive property or privilege is claimed are defined as follows:

1. A power window assembly for a rear window opening of a truck cab, the rear window opening having an inboard channel and an outboard channel, the power window assembly comprising:

a pair of stationary window panes spaced apart and securely mounted in the outboard channel of the rear window opening and defining therebetween a center window opening;

a raceway formed along the rear window opening inboard of the inboard channel;

first and second movable window panes slidably located in the inboard channel of the rear window opening and adapted for sliding movement toward each other to a closed position where the panes abut each other closing the center window opening and away from each other to an opened position overlying at least a portion of the stationary window panes thereby opening the center window opening;

a reversible electric motor having a single drive means connected to a primary drive gear for generating rotary motion of the primary drive gear;

a tape having a plurality of slots engaging and driven by the primary drive gear so that the tape moves in a translational push-pull movement upon rotation of the primary drive gear by the motor;

a track extending between the primary drive gear and the first movable window pane for guiding the tape;

an arm of the first movable window pane projecting downward and inboard into the raceway and the arm having a plurality of teeth depending into the track and engaging the slots in the tape for driving the first movable window pane so that the translational push-pull movement of the tape moves the first movable window pane between the closed position and the opened position;

an arm of the second movable window pane projecting downward and inboard into the raceway and the arm having a rack received in the raceway; and a secondary drive gear rotatably mounted and engaging the tape and the rack of the second movable window pane so that the tape drives the secondary drive gear and the secondary drive gear drives the second movable window pane whereby the movable window panes move simultaneously toward each other to the closed position and away from each other to the opened position.

* * * * *